(12) United States Patent
Behling et al.

(10) Patent No.: US 12,337,681 B2
(45) Date of Patent: Jun. 24, 2025

(54) DECENTRALIZED TRACTION CONTROL

(71) Applicant: Fraunhofer-Gesellschaft zur Förderung der angewandten Forschung e.V., Munich (DE)

(72) Inventors: Jan Behling, Dortmund (DE); Mathias Rotgeri, Dortmund (DE); Jan Sören Emmerich, Dortmund (DE); Dirk Höning, Dortmund (DE); Patrick Klokowski, Dortmund (DE); Christian Hammermeister, Dortmund (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 238 days.

(21) Appl. No.: 18/311,982

(22) Filed: May 4, 2023

(65) Prior Publication Data

US 2023/0271498 A1 Aug. 31, 2023

Related U.S. Application Data

(63) Continuation of application No. PCT/EP2021/080788, filed on Nov. 5, 2021.

(30) Foreign Application Priority Data

Nov. 8, 2020 (DE) ...................... 10 2020 214 004.9

(51) Int. Cl.
*B60K 23/08* (2006.01)
*B60B 19/00* (2006.01)
(Continued)

(52) U.S. Cl.
CPC ........ *B60K 23/0808* (2013.01); *B60B 19/003* (2013.01); *B60K 17/356* (2013.01); *B60K 2023/0858* (2013.01); *B62D 61/00* (2013.01)

(58) Field of Classification Search
CPC ............. B60K 23/0808; B60K 17/356; B60K 2023/0858; B60K 7/0007; B60B 19/003; B62D 61/00
See application file for complete search history.

(56) References Cited

U.S. PATENT DOCUMENTS

2018/0043951 A1 2/2018 Uebelhart et al.

FOREIGN PATENT DOCUMENTS

| CN | 104943873 A | 9/2015 |
|---|---|---|
| CN | 108149989 A | 6/2018 |

(Continued)

OTHER PUBLICATIONS

International Search Report and Written Opinion issued in application No. PCT/EP2021/080788.

*Primary Examiner* — Michael V Kerrigan
(74) *Attorney, Agent, or Firm* — McClure, Qualey & Rodack, LLP

(57) ABSTRACT

A vehicle includes an omnidirectional drive system configured to provide a movement of the vehicle, wherein the omnidirectional drive system includes a multitude of omnidirectional drive means, wherein each of the multitude of omnidirectional drive means includes a decentralized computing means and an associated actuator set up for providing a movement contribution for the movement. The vehicle includes a controlling means for providing a controlling command to the omnidirectional drive system containing an instruction for performing a movement. Each of the decentralized computing means is configured to determine a target movement for the vehicle, and to determine, from the target movement, a control of the associated actuator for a target movement contribution, and to determine an offset and to correct the same.

20 Claims, 6 Drawing Sheets

(51) Int. Cl.
 *B60K 17/356* (2006.01)
 *B62D 61/00* (2006.01)

(56) References Cited

FOREIGN PATENT DOCUMENTS

DE 10 2017 217827 A1 4/2019
JP 2017-005814 A 1/2017

DECENTRALIZED TRACTION CONTROL

CROSS-REFERENCES TO RELATED APPLICATIONS

This application is a continuation of copending International Application No. PCT/EP2021/080788, filed Nov. 5, 2021, which is incorporated herein by reference in its entirety, and additionally claims priority from German Application No. 10 2020 214 004.9, filed Nov. 8, 2020, which is incorporated herein by reference in its entirety.

The present invention relates to vehicles with an omnidirectional drive system, a sorting system with a multitude of such vehicles, as well as a method and a computer program product for operating a vehicle. The present invention particularly relates to a decentralized traction control by using unused resources in partial systems.

BACKGROUND OF THE INVENTION

Vehicles moving with omni wheels in a planar manner have to selectively control each of their driven wheels, at least three, to travel along the desired trajectory. If such vehicles are operated at the maximum limit of their physical properties, i.e. shortly before the wheels lose traction or slip, there are several dominant factors that limit the closed-loop control quality. On the one hand, all physical forces occurring have to be considered in the closed-loop control, on the other hand, the closed-loop control includes a computing time so that new adjustment values can be calculated only within a certain time span, e.g. every 20 milliseconds, with said adjustment values than being constantly set by the drive over the duration. If there is a disturbance at the beginning of this time span, an error will add up starting from this point in time and will only be considered in the next closed-loop control cycle.

Systems for traction control are known for quite some time. They are considered to be support systems for human drivers. However, in automated vehicles, traction control is part of the central closed-loop control that is cyclically computed at a fixed rate, e.g. every 20 milliseconds. Subsequently, a target value is transmitted to each drive. After a cycle, the current values are measured, an a new cycle takes place.

Known systems have a disadvantage that they provide insufficient results particularly at the physical limits mentioned.

Thus, there is a need for precise traction slip control concepts.

An object of the present invention is to provide vehicles, sorting systems with such vehicles, methods for operating a vehicle and a corresponding computer program product enabling to react precisely to offsets from the target value.

SUMMARY

An embodiment may have a vehicle, comprising: an omnidirectional drive system configured to provide a movement of the vehicle; wherein the omnidirectional drive system comprises a multitude of omnidirectional drive units, wherein each of the multitude of omnidirectional drive units comprises a decentralized computing unit and an associated actuator set up for providing a movement contribution for the movement; a controlling unit for providing to the omnidirectional drive system a controlling command comprising an instruction for performing the movement; wherein each of the decentralized computing units is configured to determine a target movement for the vehicle; and to determine, from the target movement, a control of the associated actuator for a target movement contribution; and to determine an offset between the target movement contribution and an actual movement contribution and to perform a correction on the basis of the offset.

Another embodiment may have a sorting system with a multitude of vehicles according to the invention.

Another embodiment may have a method for operating a vehicle with an omnidirectional drive system configured to provide a movement of the vehicle; wherein the omnidirectional drive system comprises a multitude of omnidirectional drive units, wherein each of the multitude of omnidirectional drive units comprises a decentralized computing unit and an associated actuator set up for providing a movement contribution for the movement, the method comprising: providing to the omnidirectional drive system a controlling command comprising an instruction for performing the movement; determining a target movement for the vehicle with each of the decentralized computing units; determining, from the target movement, a control of the associated actuator for a target movement contribution with each of the decentralized computing units; and determining an offset between the target movement contribution and an actual movement contribution with each of the decentralized computing units; and performing a correction on the basis of the offset.

Another embodiment may have a non-transitory digital storage medium having a computer program stored thereon to perform the method for operating a vehicle with an omnidirectional drive system configured to provide a movement of the vehicle; wherein the omnidirectional drive system comprises a multitude of omnidirectional drive units, wherein each of the multitude of omnidirectional drive units comprises a decentralized computing unit and an associated actuator set up for providing a movement contribution for the movement, the method comprising: providing to the omnidirectional drive system a controlling command comprising an instruction for performing the movement; determining a target movement for the vehicle with each of the decentralized computing units; determining, from the target movement, a control of the associated actuator for a target movement contribution with each of the decentralized computing units; and determining an offset between the target movement contribution and an actual movement contribution with each of the decentralized computing units; and performing a correction on the basis of the offset, when said computer program is run by a computer.

A core idea of the present invention is to have recognized that, by a localized consideration and evaluation of an offset of a drive, or of the vehicle, from the controlled target movement, and a decentralization of a respective computing means, low latencies and precise results can be obtained. It has further been recognized that these solutions can possibly be obtained with low effort, since drive means used for vehicles often comprise unused computing power which can be used for the inventive embodiments.

According to an embodiment, a vehicle comprises an omnidirectional drive system configured to provide a movement of the vehicle. The omnidirectional drive system comprises a multitude of omnidirectional drive means (or drive units), wherein each of the multitude of omnidirectional drive means comprises a decentralized computing means (or computing unit) and an associated actuator set up for providing a movement contribution for the movement. The vehicle includes a controlling means (or controlling unit) for providing to the omnidirectional drive system a controlling command containing an instruction for performing the movement. Each of the decentralized computing means is configured to determine a target movement contribution for the decentralized drive means from a target movement for the vehicle, and to determine a control of the associated actuator from the target movement contribution. In addition, each of the decentralized computing means is configured to determine an offset between the target movement contribution and an actual movement contribution, e.g. by means of a travel vector, and to perform a correction, e.g. so as to be able to at least partially reduce the offset. This means that an offset from the target movement can already be detected locally, which may be obtained with low latencies, possibly with redundant computing capabilities and very precisely.

According to an embodiment, each of the multitude of omnidirectional drive means provides a decentralized traction control for the drive system. By a decentralized implementation of the traction control, a combination of corresponding results in a central computing means can be omitted, which leads to a quick reaction time.

According to an embodiment, the controlling means is configured to provide, for a matching time interval, the same controlling command to each of the multitude of omnidirectional drive means, e.g. as a so-called broadcast. This enables that the parallely-controlled drive means generate the same or comparable target quantities so that a simple correction of the control is also easily possible in a drive means providing offsets.

According to an embodiment, each of the decentralized computing means is configured to detect the offset of the movement contribution actually provided by the associated actuator with respect to the target movement contribution, and to change the control of the associated actuator on the basis of the offset for a subsequent time interval so as to reduce the offset. This enables a local error correction, which goes along with a low degree of complexity.

According to an embodiment, the decentralized computing means is configured to determine a correction vector for a travel vector representing the target movement, and to perform the control on the basis of a combination of the travel vector and the correction vector so as to reduce the offset. In other words, the decentralized computing means may compensate an offset, e.g. by means of a linear combination with the correction vector, to obtain the target movement on the basis of a changed control, which is possible with a low degree of complexity.

According to an embodiment, each of the multitude of omnidirectional drive means comprises an associated sensor means (or sensor unit) so as to capture the movement the vehicle and/or the actual contribution in a decentralized way, and to determine the offset on the basis of the movement and/or the actual contribution determined in a decentralized way. Through this, information redundancy may be obtained, and, furthermore, an elaborate communication or a request of a centralized sensor by means of several decentralized means may be avoided.

According to an embodiment the sensor means includes an optical flow sensor, and the drive means is configured to determine the movement by using the optical flow sensor. Flow sensors have the advantage that they may provide movement information with very low latencies.

According to an embodiment, the drive means is configured to determine the offset on the basis of a rotational speed of the decentralized actuator, a current consumption of the decentralized actuator, and/or the movement of the mobile apparatus. This means that the offset may be determined on the basis of a comparison of the input quantities and the output quantity, which is easily possible with low computing durations.

According to an embodiment, each of the decentralized computing means is configured to detect an offset of the movement contribution provided by the associated actuator with respect to the target movement contribution, and to transmit the offset to other drive means of the multitude of omnidirectional drive means. For example, this enables that, by means of an offset of the overall travel vector generated by one of the decentralized drive means, a compensation with the help of other decentralized drive means may take place so that even large deviations in a decentralized drive means may be compensated.

According to an embodiment, one of the drive means is configured to receive information indicating an offset between the target movement contribution and an actual movement contribution generated by another drive means. The decentralized computing means is configured to adapt the control of the associated actuator on the basis of the offset of the other drive means. Particularly in combination with the possibility to transmit its own offset, the complementary part to compensate an error in another drive means may be implemented through this.

According to an embodiment, the decentralized computing means is configured to obtain, from the information obtained from the other drive means, a correction vector for a travel vector representing the target movement or the target movement contribution, e.g. by directly receiving the travel vector or by the decentralized computing means calculating the same, and to perform the control on the basis of a combination of the travel vector and the correction vector so as to adapt the control. This means that the drive means can adapt the controlling command given by a centralized controlling means to compensate an error in another drive means, enabling a high degree of flexibility and a low degree of latency, which is both advantageous.

According to an embodiment, the controlling means is connected to the decentralized computing means via a bus system. Bus systems enable quick and robust transmission of information.

According to an embodiment, at least one of the omnidirectional drive means includes an omni wheel. This enables precise omnidirectional movements.

According to an embodiment, at least one of the drive means includes Mecanum wheels, which also comprise good properties for omnidirectional movements.

According to an embodiment, the vehicle is formed as a robot for cargo transport.

According to an embodiment, a sorting system includes a multitude of vehicles according to the embodiments described herein.

According to an embodiment, a method for operating a vehicle, comprising an omnidirectional drive system configured to provide a movement of the mobile apparatus, wherein the omnidirectional drive system comprises a multitude of omnidirectional drive means, wherein each of the multitude of omnidirectional drive means comprises a decentralized computing means and an associated actuator set up for providing a movement contribution for the movement, comprises the following steps: providing to the omnidirectional drive system a controlling command containing an instruction for performing the movement, determining a target movement for the vehicle with each of the decentralized computing means, determining a control of the associated actuator for a target movement contribution with each of the decentralized computing means from the target movement, and determining an offset between the target movement contribution and an actual movement contribution with each of the decentralized computing means, and performing a correction on the basis of the offset.

A further embodiment provides a computer program product with a program code for performing such a method.

BRIEF DESCRIPTION OF THE DRAWINGS

Embodiments of the present invention will be detailed subsequently referring to the appended drawings, in which:

FIG. 3b shows a schematic illustration of the embodiments described herein with respect to the error of FIG. 3a.

DETAILED DESCRIPTION OF THE INVENTION

Figure 1A:
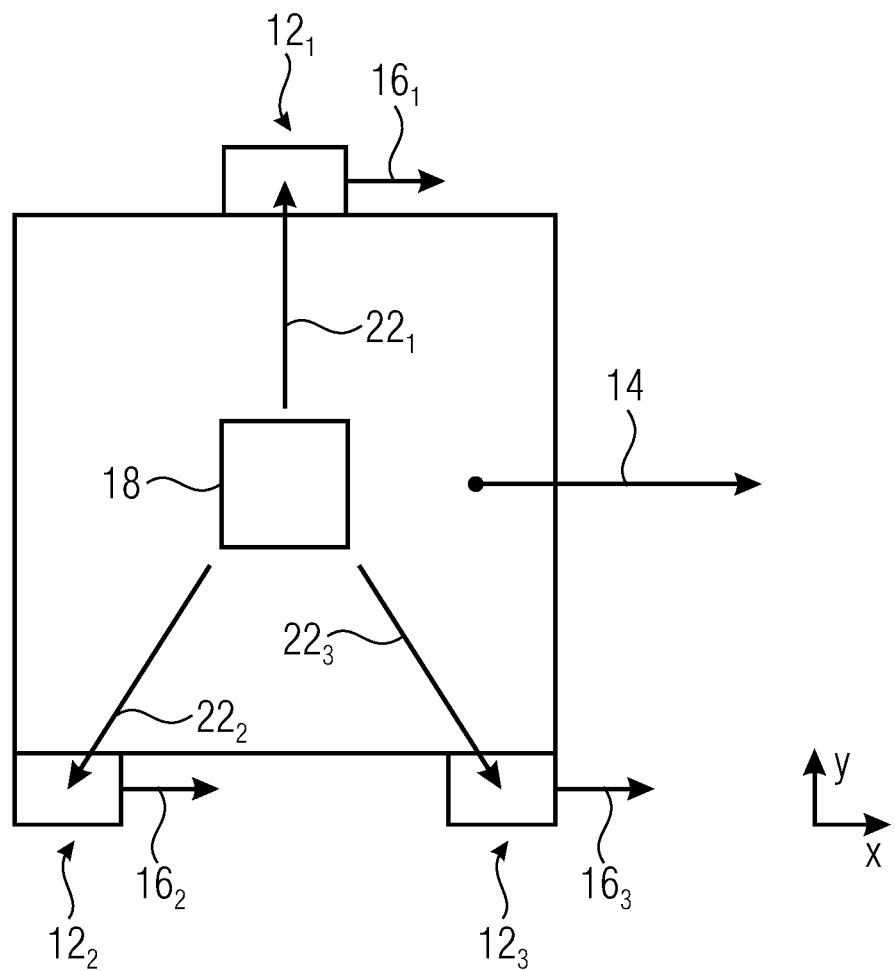
FIG. 1a shows a schematic block circuit diagram of a vehicle according to an embodiment.

Before embodiments of the present invention are subsequently described in more detail on the basis of the drawings, it is to be noted that identical or functionally identical elements, objects, and/or structures, or elements, objects and/or structures with the same effect are provided with the same reference numerals in the different drawings, so that the description of these elements given in the different embodiments is interchangeable, or can be applied to each other.

Embodiments described in the following are described in connection with a multitude of details. However, embodiments can also be implemented without these detailed features. In addition, for the purpose of comprehensibility, embodiments are described by using block circuit diagrams as a substitute of a detailed illustration. Furthermore, details and/or features of individual embodiments may be combined, as long as not explicitly noted otherwise.

Embodiments described herein relate to vehicles with an omnidirectional drive system. Such vehicles may be referred to as holonomic vehicles. This means that the number of controllable degrees of freedom may be equal to the number of degrees of freedom present in the system overall. A holonomic vehicle, or a holonomic robot, may be understood to be a means that is capable of travel through each trajectory in the so-called configuration space, that is the space formed of the exemplarily three degrees of freedom with the positions X, Y, and the rotation, as long as the boundary condition of the acceleration is adhered to. These vehicles stand in contrast to vehicles such as an automobile, which are typically not able to drive sideways into a parking spot. Here, comparably complex trajectories have to be selected to move the vehicle sideways by two meters, e.g. since the automobile has only two controllable degrees of freedom. Here, it is assumed that systems of vehicles travelling on the ground have three degrees of freedom, two for the positions X and Y and one for the rotation.

Several concepts are known for the implementation of a so-called omnidirectional drive means, wherein embodiments are particularly directed to vehicles whose drive means include omni wheels and/or Mecanum wheels comprising good properties for the movement of a vehicle. For example, a difference between omni wheels and Mecanum wheels is that, in the direction of travel, omni wheels can receive little or no side forces, however, Mecanum wheels are able to do that. Regardless, identical or similar kinematics can be realized with Mecanum wheels and omni wheels, leading to a good usability of both means.

Embodiments described herein relate to movement contributions performed by a decentralized drive means as a component to an overall movement of the vehicle. For example, the movement contribution is a force so that a sum of forces of several decentralized drive means may provide a total force leading to acceleration, deceleration, change of direction, or the like for the vehicle. This force depends on several factors, such as frictional values, the weight of the vehicle, the electrical energy provided, or the like, so that these factors, such as a supplied current directly correlated with the force, may also be considered as a contribution to the movement in the context of the embodiments.

Embodiments described herein refer to vehicles in general, and, in particular, are described as cargo robots or robots for cargo transport. In particular, they are autonomously or at least partially autonomously moving vehicles, such as in a logistic center or other types of sorting systems.

FIG. 1a shows a schematic block circuit diagram of a vehicle 10 according to an embodiment. The vehicle 10 includes an omnidirectional drive system configured to provide a movement of the vehicle. It is in the sense of an omnidirectional drive system to be able to describe each trajectory, in agreement with the definition of a holonomic vehicle, at least by adhering to the physical boundary conditions, such as accelerations or the like. To this end, the omnidirectional drive system comprises a multitude of omnidirectional drive means $12_1$, $12_2$ and $12_3$. The omnidirectional drive system includes three, possibly also 4, 5, or a higher number of drive means 12 that may be attached to the vehicle 10 so as to be distributed symmetrically or asymmetrically. For example, each of the drive means $12_1$ to $12_3$ is configured to apply a force to a ground to be travelled so as to provide a force component and/or a movement component for a movement 14 of the vehicle 10. The movement contributions $16_1$, $16_2$ and $16_3$, respectively, provided by the drive means $12_1$ to $12_3$, may be unidirectional, i.e. at least in their direction, advantageously also unidirectional in their size, e.g. to perform a movement along a straight line. However, the movement contributions $16_1$, $16_2$ and $16_3$ may also be arranged along different x/y directions, e.g. to provide the movement 14 along a straight line in combination, or to enable a rotation of the vehicle 10.

The vehicle 10 includes a controlling means for providing to the omnidirectional drive system a controlling command containing an instruction for performing the movement 14. Here, each of the drive means $12_1$, $12_2$ and $12_3$ may receive a controlling command $22_1$, $22_2$ and $22_3$, respectively. The controlling commands $22_1$, $22_2$ and $22_3$ may differ from each other, however, they are advantageously formed so as to match or to be identical, so that each of the plurality of omnidirectional drive means may receive the same controlling command for a matching time interval. To this end, several signals of the same content may be transmitted to different drive means $12_1$, $12_2$ and $12_3$, and/or one signal may be transmitted to several drive means.

In this case, the movement contributions $16_1$ to $16_3$ may be extracted directly from or be derived from the controlling commands. Thus, for example, the respective controlling command $22_1$ to $22_3$ may contain a specific instruction for the respective decentralized drive. However, it is advantageous that the decentralized drive means, knowing the geometry of the vehicle, such as the relative position of the decentralized drive means, may create a control to be applied for the respective actuator from a desired travel direction, travel vector, or trajectory indicated in the controlling commands $22_1$ to $22_3$, so that, e.g., each of the decentralized drive means may obtain a matching control, however, implements it differently on the basis of the different positions of the respective decentralized drive means 12, i.e. creates different target contributions that the respective drive means is to deliver.

At this point, it becomes clear that the movement of the vehicle is directly linked to the control of the individual drive means, i.e. their target contributions, so that, with knowledge of the vehicle geometry given in embodiments, a mutual transition between a single target contribution and the vehicle movement, or an actual movement contribution and an actual vehicle movement, and/or the effect that an offset between the target movement contribution and the actual movement contribution has with respect to the movement of the vehicle, may be easily determined by the decentralized drive means, and that discussions with respect to one of the respective pair of terms directly relates to the other term.

Figure 1B:
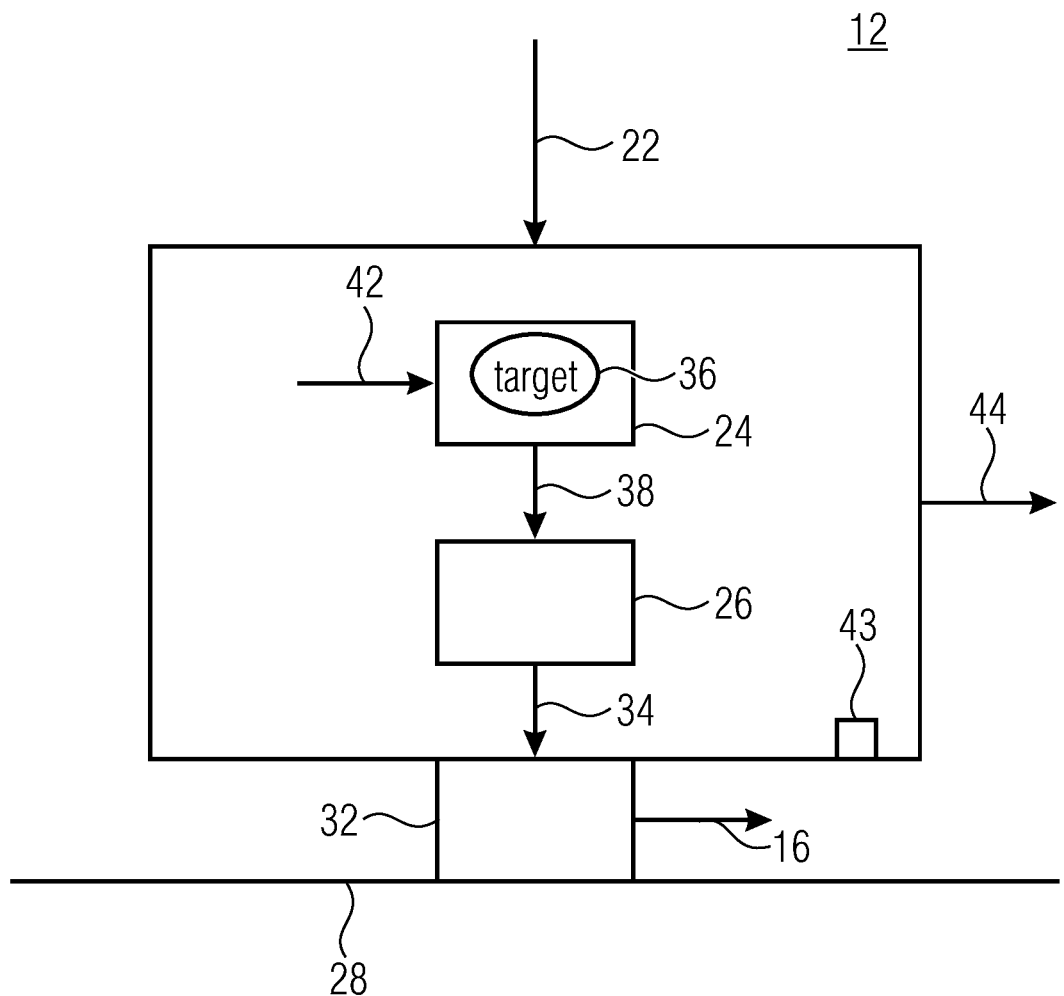
FIG. 1b shows a schematic block diagram of an omnidirectional drive means of the vehicle of FIG. 1a according to an embodiment.

FIG. 1b shows a schematic block diagram of an omnidirectional drive means 12 of the vehicle 10, e.g. the drive means $12_1$. The omnidirectional drive means includes a decentralized computing means 24 and an actuator 26 associated with the decentralized computing means and set up for providing the target movement contribution 16. Here, it is possible that the actuator 26 is in direct contact with a travel surface 28, such as a ground or the like, to directly generate the movement contribution 16. Alternatively, a transmission member 32 receiving a force 34 of the actuator 26 and converting it into the movement contribution 16 is provided. For example, the transmission member 32 may include a wheel, in particular an omni wheel or a Mecanum wheel. However, for most of the embodiments described herein it is not important whether the actuator 26 and the transmission member 32 are commonly understood to be the actuator or to be separate components. This means that even if some of the discussions described herein refer to the actuator 26, they do not preclude the common consideration with the transmission member 32. In other words, the drive means 12 may include a wheel, a motor/actuator, and a controller, such as the computing means 24. In particular, the computing means 24 may include a processor or CPU, a microcontroller, or any other programmable controlling means, such as a field-programmable gate array (FPGA) or the like.

The decentralized computing means 24 is configured to determine, from the controlling command 22 possibly indicating a target movement of the vehicle 26, a target movement contribution 16 for the vehicle, and to determine a control 38 of the associated actuator from the target movement contribution 16. While the controlling command 22 may be equal for all drive means $12_1$ to $12_3$ of the vehicle 10, for example, the specific target movement 36 may also be identical in all decentralized drive means, or in decentralized computing means 24. However, the controls 38 derived therefrom may be different in the different drive means $12_1$ to $12_3$, e.g. on the basis of the knowledge or consideration of the location of the decentralized drive means, or actuator, at the vehicle.

Furthermore, the decentralized computing means 12 is configured to determine an offset from the travel vector, e.g. by the decentralized computing means 24 obtaining information about a current movement 42 of the vehicle, which may be obtained, e.g., by determining the actual movement contribution. The decentralized computing means 24 is further configured to, in case of an offset between the target movement contribution 16 and the current movement 42, or the current movement contribution or the actual movement contribution, start measures to correct the offset from the travel vector. To this end, such a measure may contain an instruction to itself, e.g. an adaption of the control 38 with respect to a change of speed and/or direction of its own movement contribution. Alternatively or additionally, the drive means 12, e.g. by means of the decentralized computing means 24, may transmit to one or several other drive means an instruction 44 containing an instruction to adapt their control. This may be an explicit instruction, but is may also be information allowing a conclusion to be drawn at the other drive means as to the correction measures to be performed. For example, the instruction 44 may contain information about a correction vector that contains an offset between the target movement 36, e.g. considered as a vector, and the current movement 42, which, according to the above discussions, is synonymous with the actual movement contribution, e.g. considered as a vector.

Through this, the offset may be significantly reduced or compensated, however, it may be at least partially reduced, which is already an improvement. The decentralized computing means may be configured to obtain, from this information, a correction vector or a travel vector representing the target movement, and to perform the control on the basis of a combination of the travel vector and the correction vector so as to adapt the control. This means that a control adapted in such a way may already be corrected so as to compensate the error at least in part. This may be done without limitations on the basis of the local travel vector and the global travel vector, which, in contrast to the local travel vector describing the movement of the decentralized drive means, may describe the travel vector of the vehicle.

According to embodiments, the decentralized drive means 12 may comprise a sensor means 43 associated with the drive means 12, wherein said sensor means enables, in the vehicle 10, capturing the movement of the mobile apparatus in a decentralized way in the drive means $12_1$ to $12_3$, and to determine the offset of the actual movement contribution from the target movement contribution on the basis of the movement determined in a decentralized way. For example, the sensor means may include optical sensors, in particular an optical flow sensor, or a sensor for capturing an optical flow, such as an image sequence. The optical flow may be understood as a vector field of the speed of visible points, projected in an image plane, of the object space in the reference system of the imaging optic, which means that a shift of points in sequentially-captured images may allow a conclusion to be drawn as to the speed. Here, it is to be noted that the results of the sensor means 43 may possibly deliver results that are valid for the location of the sensor means 43 and therefore of the drive means, however, which may deviate from an overall movement vector of the movement 14 on the basis of an offset from a geometrical center point of the vehicle 10. Regardless, the drive means may be configured to determine the movement by using the sensor means 43 and in particular the optical flow sensor. An offset, or influence, of the sensor signal on the basis of the local position may even be desirable, since it allows to obtain precise indications as to how the control is to be adapted on site, within the drive means 12.

Some of the sensors used may be a shared resource, i.e. a shared sensor for several sensor means 43. Thus, for example, the optical flow may provide information for several decentralized drive means while monitoring of rotational speed is carried out in a decentralized way since the information is present in a decentralized manner.

For example, the decentralized computing means may recognize that the rotational speed of a wheel deviates from a value as desired in the target movement contribution and/or expected by means of the energy supplied, such as the electric current, which, e.g., may be an indication as to a traction or other effects of the wheel. Alternatively or additionally, an optical sensor may indicate that the actually achieved local speed deviates in its amount and/or direction from the target movement contribution.

The drive means 12 may be configured to determine the offset on the basis of a rotational speed of the decentralized actuator 26, a current consumption of the decentralized actuator 26 measured directly as a current or indirectly, e.g. via an electric voltage or the like, and/or the movement, e.g. acquired via the sensor means 43. Thus, the rotational speed of the decentralized actuator in combination with the power consumption or current consumption of the decentralized actuator may already indicate whether the power provided is translated into a rotational speed to the desired extent and/or whether the rotational speed obtained results in the desired movement of the vehicle. Thus, several error sources may be monitored at the same time.

In summary, each of the decentralized computing means may be configured to determine an offset of the movement contribution provided by the associated actuator with respect to the target movement overall and/or with respect to the target movement contribution, and to transmit the offset to other drive means of the multitude of omnidirectional drive means. In the example of the above described traction, e.g., this may contain an instruction to decrease the drive power so as to reduce or to avoid a change of the actual trajectory with respect to the target movement. For example, such an instruction may be formulated such that information, e.g. a correction vector, may contain information to the other drive meansm, configured such that the contribution derived therefrom for the creating decentralized drive means is within the limits that the decentralized drive means is actually able to adhere to. This enables a reasonable reaction to this offset at this location. Alternatively or additionally, it is possible that the remaining drive means are informed about their own offset and, in this case, may already react early, e.g. by the decentralized computing means determining that the provided drive power or the electric current does not lead to a desired rotational speed and/or speed. In particular, the knowledge about their own control is available locally and can there already be evaluated regarding offsets.

Accordingly, drive means are configured to receive corresponding information indicating an offset between a target movement and a movement contribution generated by another drive means. The decentralized computing means there may be configured to adapt the control of the associated actuator on the basis of the offset of the other drive means.

Figure 2:
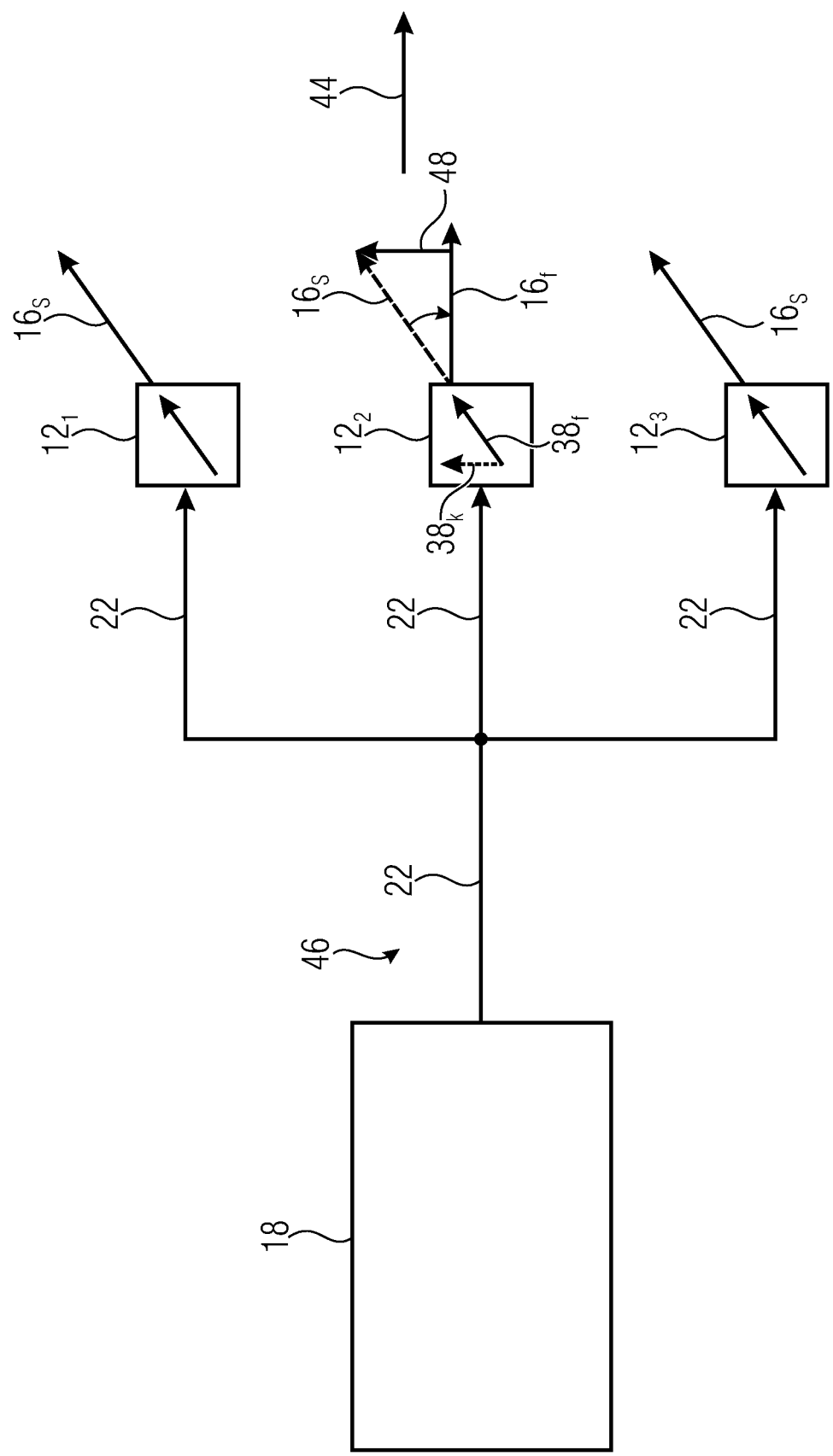
FIG. 2 shows a schematic block circuit diagram of a circuitry of a controlling means of a vehicle with several drive means according to an embodiment.

FIG. 2 shows a schematic block circuit diagram of a circuitry of the controlling means 18 with the drive means 12 $12_1$, $12_2$ and $12_3$ according to an embodiment. For example, the controlling means 18 is connected to the drive means $12_1$ to $12_3$ via a bus system 46, such as a CAN Bus (CAN=Controller Area Network) or other field buses. For example, this enables the transmission of one and the same controlling command 22 to several drive means $12_1$, $12_2$ and/or $12_3$ as a common message or separate messages that are effective at least for the same time interval of the control.

Furthermore, FIG. 2 describes an exemplary error case in which the drive means $12_2$ provides an erroneous movement contribution $16f$ that deviates from a desired movement contribution $16_s$ so that an erroneous total sum of movement contributions leads to an offset of the movement 14 from the target movement.

For example, the drive means 12 may determine a decentralized correction vector 48 and combine the same with its own drive so as to correct the control $38f$ leading to errors to a corrected control $38k$ so that the drive means may again provide the correct movement contribution $16_s$ on the basis of the amended control. Optionally, the drive means 12 may transmit the instruction 44 to one or several drive means $12_1$ and/or $12_2$ so that these drive means are also able to change their control, if necessary. For example, this may be relevant in order to return to a desired trajectory after an offset of the vehicle from the same and/or to obtain the desired movement 14 in combination with other adapted drive means.

Figure 3A:
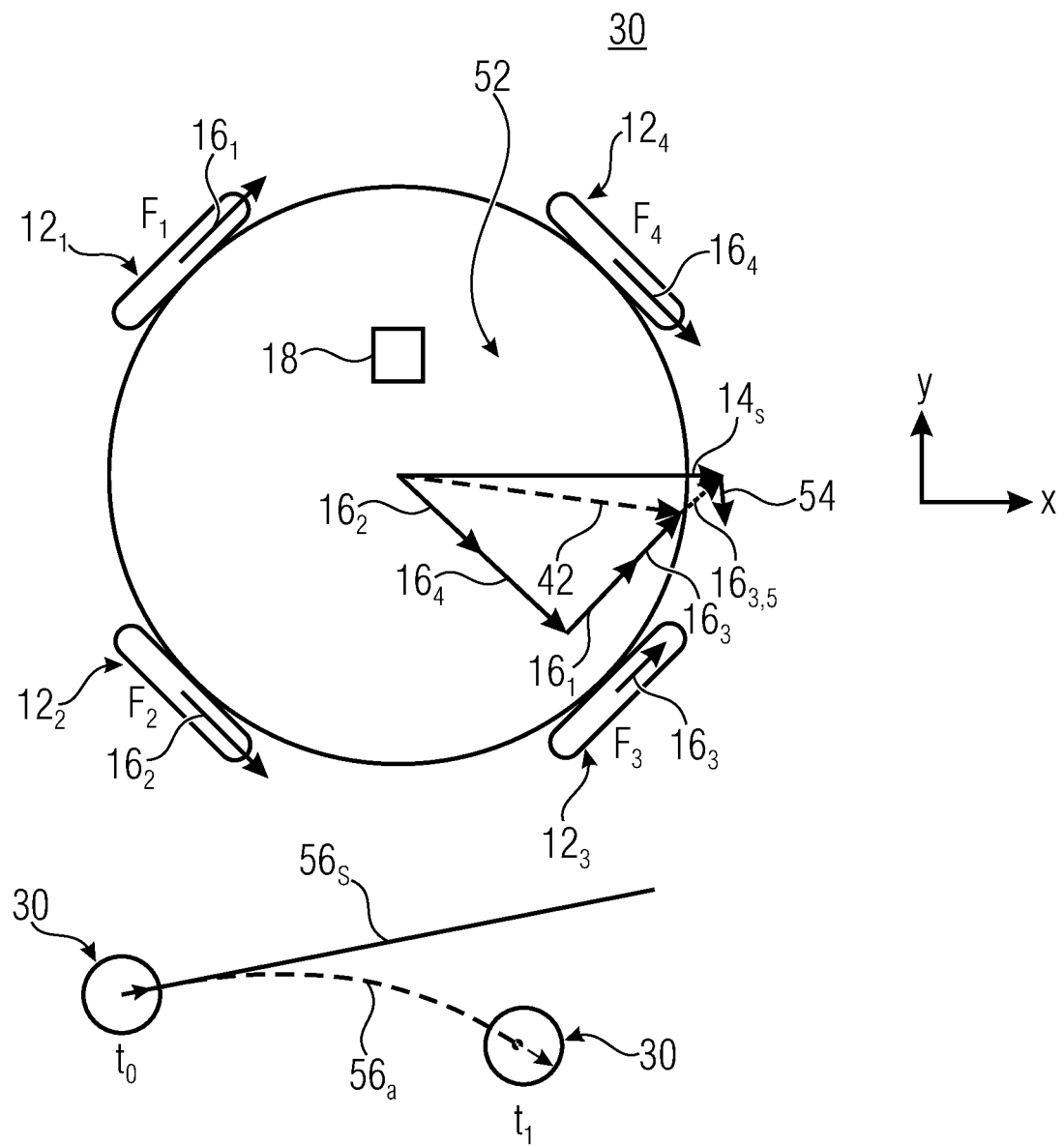
FIG. 3a shows a schematic top view of a vehicle according to an embodiment, exemplarily comprising four drive means arranged symmetrically, as well as a schematic illustration of an occurring error.

FIG. 3a shows a schematic top view of a vehicle 30 according to an embodiment. The vehicle 30 exemplarily includes four drive means $12_1$ to $12_4$ arranged symmetrically so as to enable an omnidirectional movement of the vehicle 30. To achieve a desired movement $14_s$ by means of a transmission of appropriate controlling commands by the controlling means 18, a control of the drive means $12_1$ to $12_4$ is carried out. The movement contributions $16_1$ to $16_4$ are exemplarily illustrated as force vectors $F_1$, $F_2$, $F_3$ and $F_4$, respectively. FIG. 3a shows an error case in which, e.g., the drive means $12_3$ provides an erroneous movement contribution $16_3$ that leads in the illustrated force diagram 52 to the fact that the actual current movement 42 deviates from the target movement $14_s$, by the offset between the desired movement contribution $16_{3,s}$, the target size and the actual movement contribution $16_3$, for example. This leads to an offset 54 that changes the actual direction and speed of the vehicle 30, which, without a correction, leads to an offset trajectory $56_a$ of the vehicle 30 from the illustrated point in time $T_0$ to the next point in time $T_1$, e.g. the next closed-loop control interval, and compared to a target trajectory $56_s$.

Figure 3B:
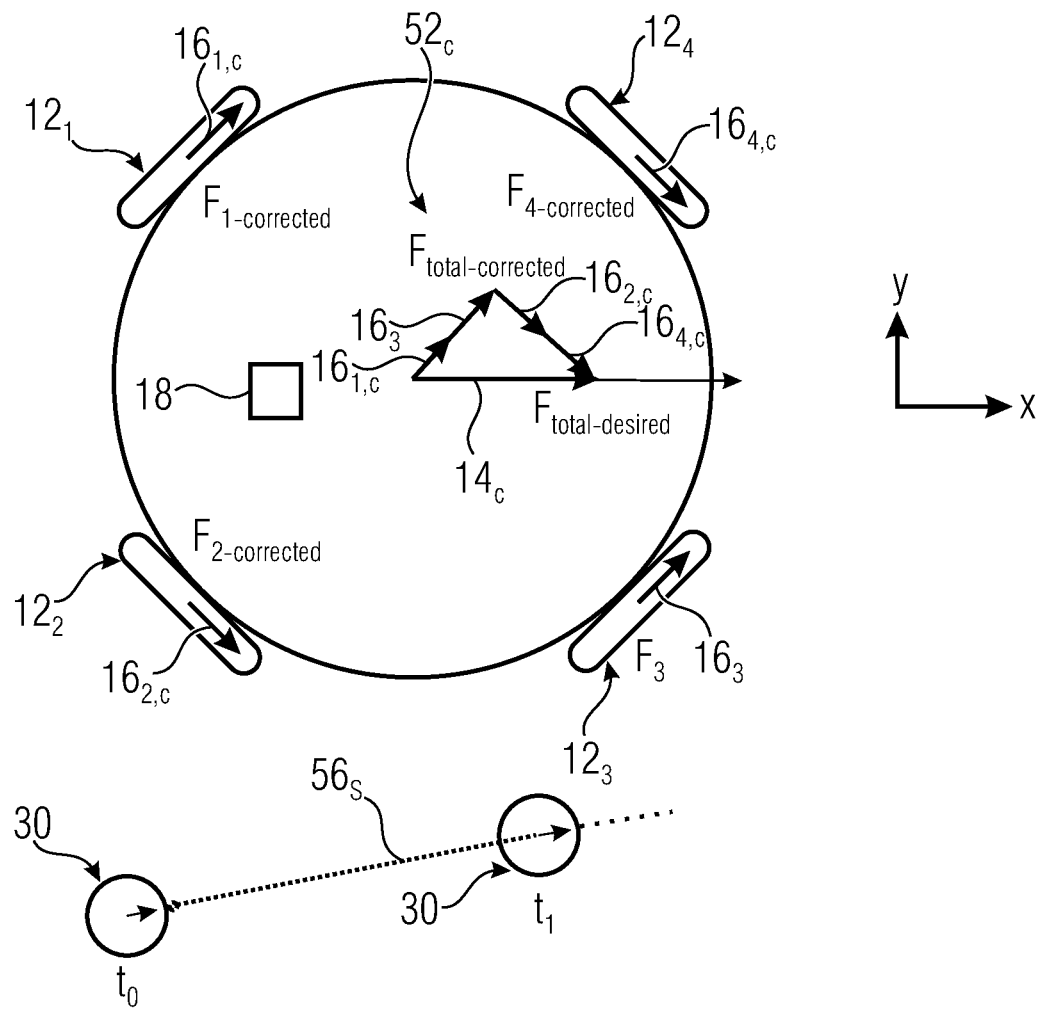

FIG. 3b shows a possible effect of the embodiments described herein. Thus, for example, the other drive means $12_1$, $12_2$ and $12_4$ obtain knowledge of the offset of the drive means $12_3$ and, on the basis thereon, may adapt their own control, which may result in corrected controls and therefore corrected movement contributions $16_{1,c}$, $16_{2,c}$ and $16_{4,c}$ adapted to the erroneous movement contribution $16_3$.

Thus, for example, the corresponding force vectors may be reduced in size so as to reach a force vector $F_1$-corrected, $F_2$-corrected and $F_4$-corrected so that the corrected force diagram $52_c$ may maintain the desired direction in the obtained movement $14_c$, even though with a decelerated travel. This makes it possible that the vehicle 30 remains on the target trajectory $56_s$ even though the speed is possibly reduced. Since the correction may be carried out locally, a possibly decreased offset from the target trajectory is present at least on comparison to a centralized control.

It becomes clear that the multitude of omnidirectional drive means may provide a decentralized traction control for the drive system. Even though a force reduction occurs in the other drive means 12₁, 12₂ and 12₄ in the illustration of FIG. 3b, a direction change may also occur according to other embodiments, e.g. if this is required for a rotation to be performed, or the like.

According to embodiments, each of the decentralized computing means of the drive means is configured to determine an offset of the movement contribution provided by the associated actuator with respect to the target movement, and to change the control of the associated actuator on the basis of the offset for a subsequent time interval so as to reduce the offset. On the basis of the closed-loop control cycles in the decentralized drive means, the following time interval may be comparably short, and may in particular be shorter than the closed-loop control cycles of the controlling means 18, which may include time spans of, e.g., 20 milliseconds between the points in time $T_0$ and $T_1$, for example. In contrast, the decentralized drive means may be operated in time intervals that are shorter than the closed-loop control cycle of the centralized controlling means, e.g., up to 10 ms, up to 5 ms, or up to 1 ms or less. This means that the decentralized closed-loop control may be faster than the centralized control by a factor of at least 2, at least 4, or at least 20, which may also apply if the centralized control is operated with another interval.

The decentralized computing means may be configured to determine a correction factor for a travel vector representing the target movement, and to perform the control on the basis of a combination of the travel vector with the correction vector to reduce the offset, which is exemplarily illustrated on the basis of the force diagrams 52 and 52$_c$.

In other words, an aspect of the embodiments described herein is based on the fact that many partial systems in highly automated vehicles represent their own computer and are implemented as such. In the development, it is often simpler, and therefore advantageous, to use a programmable microcontroller than to develop an analoge/digital circuit just for a certain purpose. Thus, there are possibly unused resources, since the microcontrollers are usually overdimensioned. These unused resources may be used for the implementation of embodiments described herein. Thus, for example, a corresponding method for operating a vehicle with an omnidirectional drive system configured to provide a movement of the vehicle, wherein the omnidirectional drive system comprises a multitude of omnidirectional drive means and each of the multitude of omnidirectional drive means comprises an associated actuator set up for providing a movement contribution for the movement, includes the steps of providing to the omnidirectional drive system a controlling command containing an instruction for performing the movement, determining a target movement for the vehicle with each of the decentralized computing means, determining a control of the associated actuator from the target movement with each of the decentralized computing means, and determining and correcting an offset from the travel vector with each of the decentralized computing means.

In the autonomous vehicles described, such as the vehicle 10 and/or 30, e.g., each drive unit is equipped with a microcontroller, the computing means 24. The same may carry out the control of the motor/actuator and the measurement of all relevant values of the respective drive. It is the goal to follow a defined trajectory. In addition, the central closed-loop control unit, the controlling unit 18, and all drive units communicate via a serial bus, such as the bus system 46.

If it were the case that a drive means could not maintain the desired travel vector, a conventional method would only consider the relevant values and the offset in the next closed-loop control cycle. Thus, a potential error adds up to the next closed-loop control cycle.

In inventive vehicles and/or methods, in contrast to the centralized closed-loop control, a more complex instruction is transmitted. Instead of the adjustment values transmitted separately to each drive means, the desired travel vector is simultaneously transmitted to all drive means with only one package, such as per broadcast. This already leads to the first reduction of latency. If it were the case that a drive means could not maintain the desired travel vector, the affected drive unit would immediately transmit a correction vector. This is particularly possible since each drive unit has the same sensors and is at the same time a measurement point for all highly-dynamic relevant values. An offset is determined via the rotational speed progression, current progression, and the actual movement on the ground. The movement is measured with the help of an optical flow sensor in the travel plane (X, Y). Through this, each drive unit, under the assumption of the travel vector and therefore under the assumption of the movement of the other drive means, cannot only determine its own deviation, but may also determine a catch-up correction. This information is immediately transmitted, or as soon as possible, to all further drive units via broadcast. The other drive units take over the correction vector and adapt their own control.

Such a correction is a good to best possible measure at a respective point in time. Such a quick reaction results in the offset being less than in conventional methods, as can be seen on the basis of the comparison between FIGS. 3a and 3b. The resulting travel vector has approximately the same orientation, or only slight offsets, which is why the trajectory is not left significantly or is not left at all. This progression may be carried out until the next closed-loop control cycle is performed, in which the controlling means 18 may take a higher-order countermeasure. This means that, according to an embodiment, the omnidirectional drive means are configured to correct the offset between two closed-loop control steps of the controlling means. Optionally, the controlling means itself may carry out a global correction that considers the error case occurred.

Embodiments make it possible to provide a possibility to deliver effective traction control for vehicles with omni wheels, in particular, with the use of optical flow sensors, however, which maintains the course or the direction of the vehicle to a maximum possible extent. If, in contrast, the slipping wheels would be decelerated individually, the travel vector would be distorted or falsified, which ultimately generates a disturbance in the closed-loop control that would have to be accounted for, which would be the responsibility of the controlling means 18 that, however, has latencies. In addition, this method provides a closed-loop control with low latency, since possible disturbances may be directly processed on the processors of the motor controlling units, the drive means, in particular if the controlling units of all motors are connected to each other via a bus system, such as CAN.

Embodiments may be particularly implemented in vehicles with individually driven wheels. In particular, omnidirectional vehicles with omni wheels are highlighted here, since these wheels are driven individually. Application fields that involve high vehicle dynamics, such as sorting equipment with robots, are particularly concerned.

Figure 4:
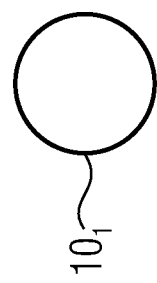
FIG. 4 shows a schematic block circuit diagram of a sorting system according to an embodiment.
Figure 4:
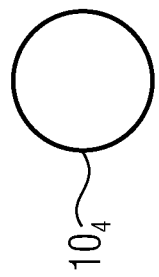
Figure 4:
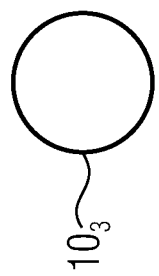
Figure 4:
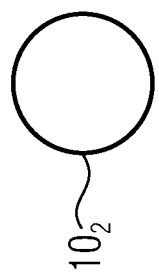

FIG. 4 shows a schematic block diagram of a sorting system 40 according to an embodiment, comprising a multitude of vehicles, such as vehicles 10 and/or vehicles 30. A number of vehicles may be at least three, at least four, at least five, at least ten or more, at least 20, 25, or 100.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable controlling signals stored thereon which may cooperate, or cooperate, with a programmable computer system such that the respective method is performed. This is why the digital storage medium may be computer-readable. Some embodiments in accordance with the invention thus comprise a data carrier which comprises electronically readable controlling signals that are capable of cooperating with a programmable computer system such that any of the methods described herein is performed.

Generally, embodiments of the present invention may be implemented as a computer program product having a program code, the program code being effective to perform any of the methods when the computer program product runs on a computer. The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A vehicle, comprising:
an omnidirectional drive system configured to provide a movement of the vehicle;
wherein the omnidirectional drive system comprises a plurality of omnidirectional drive units, wherein each of the plurality of omnidirectional drive units comprises a decentralized computing unit and an associated actuator set up for providing a movement contribution for the movement;
a controlling unit for providing to the omnidirectional drive system a controlling command comprising an instruction for performing the movement;
wherein each of the decentralized computing units is configured to determine a target movement for the vehicle; and to determine, from the target movement, a control of the associated actuator for a target movement contribution; and to determine an offset between the target movement contribution and an actual movement contribution and to perform a correction on the basis of the offset.

2. The vehicle according to claim 1, wherein each of the plurality of omnidirectional drive units provides a decentralized traction control for the drive system.

3. The vehicle according to claim 2, wherein the controlling unit is configured to provide, for a matching time interval, the same controlling command to each of the plurality of omnidirectional drive units.

4. The vehicle according to claim 1, wherein the controlling unit is configured to provide, for a matching time interval, the same controlling command to each of the plurality of omnidirectional drive units.

5. The vehicle according to claim 1, wherein each of the decentralized computing units is configured to detect the offset of the movement contribution actually provided by the associated actuator with respect to the target movement contribution, and to change the control of the associated actuator on the basis of the offset for a subsequent time interval so as to reduce the offset.

6. The vehicle according to claim 5, wherein each of the decentralized computing units are configured to determine a correction vector for a travel vector representing the target movement, and to perform the control on the basis of a combination of the travel vector and the correction vector so as to reduce the offset.

7. The vehicle according to claim 5, wherein each of the plurality of omnidirectional drive units comprises an associated sensor unit so as to capture the movement the vehicle and/or the actual contribution in a decentralized way, and to determine the offset on the basis of the movement and/or the actual contribution determined in the decentralized way.

8. The vehicle according to claim 6, wherein each of the sensor units comprises an optical flow sensor, and each of the drive units are is configured to determine the movement by using the optical flow sensor.

9. The vehicle according to claim 6, wherein each of the drive units are configured to determine the offset on the basis of a rotational speed of its associated actuator, a current consumption of its associated actuator, and/or the movement of the vehicle.

10. The vehicle according to claim 1, wherein each of the omnidirectional drive units are configured to correct the offset between two closed-loop control steps of the controlling unit.

11. The vehicle according to claim 1, wherein each of the decentralized computing units is configured to detect an offset of the movement contribution provided by the associated actuator with respect to the target movement contribution, and to transmit the offset to other drive units of the plurality of omnidirectional drive units.

12. The vehicle according to claim 1, wherein one of the omnidirectional drive units is configured to receive information indicating an offset between the target movement contribution and an actual movement contribution generated by another drive unit, omnidirectional drive unit is configured wherein the decentralized computing unit of the one of the omnidirectional drive units is configured to adapt the control of its associated actuator on the basis of the offset of the other drive unit.

13. The vehicle according to claim 12, omnidirectional drive unit is configured wherein the decentralized computing unit of the one of the omnidirectional drive units is configured to acquire, from the information, a correction vector for a travel vector representing the target movement or the target movement contribution, and to perform the control on the basis of a combination of the travel vector and the correction vector so as to adapt the control.

14. The vehicle according to claim 1, wherein the controlling unit is connected to each of the decentralized computing units via a bus system.

15. The vehicle according to claim 1, wherein each of the omnidirectional drive units comprise an omni wheels.

16. The vehicle according to claim 1, wherein each of the omnidirectional drive units comprises a Mecanum wheels.

17. The vehicle according to claim 1, said vehicle being formed as a robot for cargo transport.

18. A sorting system with a multitude of vehicles according to claim 1.

19. A method for operating a vehicle with an omnidirectional drive system configured to provide a movement of the vehicle; wherein the omnidirectional drive system comprises a plurality of omnidirectional drive units, wherein each of the plurality of omnidirectional drive units comprises a decentralized computing unit and an associated actuator set up for providing a movement contribution for the movement, the method comprising:
  providing to the omnidirectional drive system a controlling command comprising an instruction for performing the movement;
  determining a target movement for the vehicle with each of the decentralized computing units;
  determining, from the target movement, a control of the associated actuator for a target movement contribution with each of the decentralized computing units; and
  determining an offset between the target movement contribution and an actual movement contribution with each of the decentralized computing units; and performing a correction on the basis of the offset.

20. A non-transitory digital storage medium having a computer program stored thereon to perform the method for operating a vehicle with an omnidirectional drive system configured to provide a movement of the vehicle; wherein the omnidirectional drive system comprises a plurality of omnidirectional drive units, wherein each of the plurality of omnidirectional drive units comprises a decentralized computing unit and an associated actuator set up for providing a movement contribution for the movement, the method comprising:
  providing to the omnidirectional drive system a controlling command comprising an instruction for performing the movement;
  determining a target movement for the vehicle with each of the decentralized computing units;
  determining, from the target movement, a control of the associated actuator for a target movement contribution with each of the decentralized computing units; and
  determining an offset between the target movement contribution and an actual movement contribution with each of the decentralized computing units; and performing a correction on the basis of the offset,
  when said computer program is run by a computer.

* * * * *

UNITED STATES PATENT AND TRADEMARK OFFICE
CERTIFICATE OF CORRECTION

PATENT NO. : 12,337,681 B2
APPLICATION NO. : 18/311982
DATED : June 24, 2025
INVENTOR(S) : Jan Behling et al.

Page 1 of 1

It is certified that error appears in the above-identified patent and that said Letters Patent is hereby corrected as shown below:

In the Claims

Column 15, Lines 26-27 (Claim 13) - immediately following "12," please delete "omnidirectional drive unitis configured".

Signed and Sealed this
Twenty-eighth Day of October, 2025

John A. Squires
*Director of the United States Patent and Trademark Office*